(12) United States Patent
Chou

(10) Patent No.: US 9,718,181 B2
(45) Date of Patent: Aug. 1, 2017

(54) APPARATUS FOR ERGONOMIC APPLICATION OF ROTATIONAL HANDLE GARDEN TOOL

(71) Applicant: Hank Hung Kung Chou, Irvine, CA (US)

(72) Inventor: Hank Hung Kung Chou, Irvine, CA (US)

( * ) Notice: Subject to any disclaimer, the term of this patent is extended or adjusted under 35 U.S.C. 154(b) by 0 days.

(21) Appl. No.: 15/229,795

(22) Filed: Aug. 5, 2016

(65) Prior Publication Data

US 2017/0014986 A1  Jan. 19, 2017

Related U.S. Application Data

(63) Continuation-in-part of application No. 14/804,285, filed on Jul. 20, 2015.

(60) Provisional application No. 62/183,251, filed on Jun. 23, 2015.

(51) Int. Cl.

| | |
|---|---|
| *B25G 1/06* | (2006.01) |
| *B25G 1/10* | (2006.01) |
| *B25G 3/12* | (2006.01) |
| *A01B 1/02* | (2006.01) |
| *A01B 1/06* | (2006.01) |
| *A01D 7/00* | (2006.01) |
| *A01D 9/00* | (2006.01) |
| *A01B 1/24* | (2006.01) |
| *A01B 1/16* | (2006.01) |
| *A01B 1/22* | (2006.01) |
| *B25G 1/00* | (2006.01) |
| *E02F 3/02* | (2006.01) |
| *A01D 1/06* | (2006.01) |
| *A01D 1/14* | (2006.01) |

(52) U.S. Cl.
CPC ............... *B25G 1/06* (2013.01); *A01B 1/02* (2013.01); *A01B 1/06* (2013.01); *A01B 1/16* (2013.01); *A01B 1/22* (2013.01); *A01B 1/243* (2013.01); *A01D 7/00* (2013.01); *A01D 9/00* (2013.01); *B25G 1/00* (2013.01); *B25G 1/102* (2013.01); *B25G 3/12* (2013.01); *E02F 3/02* (2013.01); *A01D 1/06* (2013.01); *A01D 1/14* (2013.01)

(58) Field of Classification Search
CPC ... A01B 1/02–1/165; A01D 1/14; A01D 1/06; B25G 1/06; B25G 1/066; B25G 1/102; B25G 3/38; B25G 3/12
See application file for complete search history.

(56) References Cited

U.S. PATENT DOCUMENTS

| | | | | |
|---|---|---|---|---|
| 1,054,591 | A * | 2/1913 | Mitchels et al. ....... | B25G 1/102 16/430 |
| 1,439,913 | A * | 12/1922 | Saxe ................... | A46B 5/0075 15/172 |
| 5,927,058 | A * | 7/1999 | Hsu ..................... | A01D 7/10 56/400.16 |

(Continued)

*Primary Examiner* — Robert Pezzuto
*Assistant Examiner* — Jessica H Lutz
(74) *Attorney, Agent, or Firm* — Alexander Chen, Esq.

(57) ABSTRACT

An apparatus for an improved hand tool device wherein a rotatable apparatus may rotate the rotating handle apparatus in 15 degree increments to adjust to the user to help reduce the risk of injury and increase power application while gardening by adjusting and creating a favorable angle between the ground and the point of entry of the hand tool device into the ground.

1 Claim, 15 Drawing Sheets

(56) References Cited

U.S. PATENT DOCUMENTS

| | | | | |
|---|---|---|---|---|
| 6,113,074 A * | 9/2000 | Foley | ............... | B25C 11/00 |
| | | | | 254/131.5 |
| 8,177,272 B2 * | 5/2012 | Schinella, Jr. | ............ | E01H 5/02 |
| | | | | 294/53.5 |
| 2001/0037534 A1 * | 11/2001 | Bryan | ............... | B25G 1/06 |
| | | | | 15/144.1 |
| 2006/0144195 A1 * | 7/2006 | Tanga | ............... | B25D 1/00 |
| | | | | 81/20 |
| 2006/0147256 A1 * | 7/2006 | Richardson | ............ | B25G 1/06 |
| | | | | 403/91 |
| 2012/0133161 A1 * | 5/2012 | Mitchell | ............ | B25G 1/06 |
| | | | | 294/49 |
| 2013/0193700 A1 * | 8/2013 | Walden | ............ | A01B 1/026 |
| | | | | 294/58 |

* cited by examiner

APPARATUS FOR ERGONOMIC APPLICATION OF ROTATIONAL HANDLE GARDEN TOOL

INCORPORATION BY REFERENCE

This Application claims priority to a provisional application 62/330,054 filed on Apr. 29, 2016 and is a Continuation-in-Part of U.S. Non-Provisional patent application Ser. No. 14/804,285, filed on Jul. 20, 2015, titled "Method and Apparatus for Ergonomic Application of Rotational Handle Garden Tool," which, in turn, claimed the benefit of priority to the U.S. Provisional Patent Application No. 62/183,251, filed on Jun. 23, 2015, which are both incorporated herein by reference in their entirety.

FIELD OF INVENTION

The invention relates generally to utility hand tools. More specifically, the invention relates to hand tools used for gardening. This improved hand tool device includes a rotational handle that may rotate in 15 degree increments to help reduce the risk of injury and increase power application when gardening by creating a favorable angle between the ground and the point of entry of the hand tool device into the ground.

BACKGROUND

Gardening requires the use of a variety of tools including hand tools or power tools. A hand tool is any one of many tools made for gardens and gardening and overlaps with the range of tools made for agriculture and horticulture. A hand tool is typically ideal when a power tool might otherwise be impractical or burdensome to use. A hand tool is also generally preferred over larger gardening tools because a hand tool requires the use of only one hand, takes up minimum space, and is easily stored.

The hand tools still used by gardeners originated with the earliest agricultural implements used by man, for example, the hoe, pitchfork, fork, rake, hand cultivator, spade, shovel and hand trowel. The earliest tools were made of wood, flint, metal, tin, and bone. However, the development of metal working, first in copper and later in iron and steel, enabled the manufacture of more durable tools.

Unfortunately, repetitive strain injuries (RSI) can result from the use of hand tools while gardening due to repetitive tasks, forceful exertions, vibrations, mechanical compression, or sustained positions. RSI is an injury to the musculoskeletal and nervous systems that may affect any part of the body and at times at multiple locations, such as, but not limited to, the neck, shoulder, elbow, hand, wrist, and fingers. Repetitive stress injuries can develop over time and can lead to long-term disability.

According to the National Institute for Occupational Safety and Health (NIOSH), excessive force imposed on muscles may increase the potential for musculoskeletal injury and disorder. Furthermore, NIOSH cites a number of studies what indicate that even less than excessive force may predispose a person to musculoskeletal injuries and disorders, especially during repetitive activities or static activities performed with an awkward posture.

Fortunately, several methods of reducing repetitive strain injuries while gardening have been developed. Some of the most common techniques include keeping elbows partially bent, especially when doing resistive activities requiring elbow strength; avoiding twisting the forearms back and forth repeatedly; keeping wrists in a neutral position; holding objects with a light grasp for a short period of time; and squatting with heels on the ground. While all of these actions can help minimize the occurrence of repetitive stress injuries, proper hand tools with a comfort and functional design are also necessary for preventing repetitive strain injuries. In fact, proper ergonomic design is necessary to prevent repetitive strain injuries and other musculoskeletal disorders, which can develop over time and can lead to long-term disability.

Ergonomics is the practice of designing products, systems or processes to take property account of the interaction between them and the people who use them. Ergonomics is concerned with the "fit" between the user, equipment, and their environments. The goal of ergonomics is to design a tool so it creates less stress on the body. Ergonomic designs of equipment, systems, and working methods improve the comfort, health, safety, and productivity of the users.

Conventional hand tools are generally one size fits all. This approach may be sufficient for most people who use hand tools occasionally. The inexact fit of the hand tools with the shape and flexibility of the human hand causes limited problems.

Some portion of the population use hand tools daily as part of their hobby or in their chosen line of work, and for these people, the lack of exact fit to the human hand is causing serious physical injury. Therefore, manufacturers have taken the science of ergonomics and applied it to garden tools for those gardeners who are constantly using still want to be active outdoors even though they might have more physical limitations. Ergonomic hand tools are designed to keep the body in neutral positions while working, lessening the amount of stress on joints and muscles. Incorporating ergonomic design into hand tools used for gardening allows gardeners to work while exerting less energy, so they can still enjoy all the pleasures and productivity of gardening.

In gardening, ergonomic design not only reduces the risk of injury, but can also assist with power application. Ergonomic design of hand tools allows a user to set the angle that best suits them and the job they are doing. For example, the handle of a hand tool must be held at the smallest possible angle in relation to the ground, in order to propel motions, such as digging or lifting, forward as effectively as possible. If the angle between the handle and the ground becomes too large, the base of the hand tool will make less contact with the ground and will have a detrimental effect on the desired operation. In essence, effectively adjusting the angle between the handle and the ground allows a hand tool to exert pressure on a wider area, making the desired operations more efficient and easier to perform.

Currently, many hand tools are ergonomically designed with cushioned handles. Although at first the difference between cushioned and non-cushioned handles is subtle, over time the reduced strain on hand and arm muscles is noticeable. However, a cushioned handle, by itself may not be sufficient in protecting a user and satisfying all of the ergonomic requirements of a user. Moreover, the simple cushioning to the handles does not assist with or improve on the power application of the hand tools.

Thus, there is a need for a hand tool that will allow a user to lift a perform operations with as much power as possible while minimizing risk of injury. Thus, there remains a need for a hand tool that will offer a more ergonomic design to improve the comfort, health, safety, and productive of the user.

Furthermore, not only one shovel in a gardening tool set needs a swivel handle, other shovels in the set and other hand tools also do. It is desirable that the swivel handle can be easily removable and interchangeable to maximize its utility.

OBJECTIVE OF THE INVENTION

Accordingly, it is therefore an objective of the invention to provide a novel method and apparatus compatible with a variety of garden and hand tools including, but not limited to, a hoe, a rake, a shovel, a fork, an aerator, a weeder, and a knife.

It is therefore an objective of the invention to provide a novel method and apparatus to be used for a variety of applications including, but not limited to, digging and lifting.

It is therefore an objective of the invention to provide a novel method and apparatus to be adaptable and used by a user's left hand, right hand, or both.

It is therefore an object of the invention to provide a novel method and apparatus to be adaptable and used by multiple users through the rotational adjustment of the hand tool to accommodate different users.

It is therefore an objective of the invention to provide a novel method and apparatus to allow a user's hand to rotate in 15 degree increments while using the apparatus.

It is therefore an objective of the invention to provide a novel method and apparatus to allow the user's hand to return to the same axial plane as the garden tool as the user lifts the garden tool away from the ground.

It is therefore an objective of the invention to provide a novel method and apparatus to provide a locking mechanism for positioning the handle with respect to the axial plane of the garden tool.

It is therefore an objective of the invention to provide a novel method and apparatus to create a hand tool with a more ergonomic design.

It is therefore an objective of the invention to provide a novel method and apparatus to adjust the angle of the hand tool in order to provide for a better working posture of the user.

It is therefore an objective of the invention to provide a novel method and apparatus of a hand tool that improve the comfort of user using the hand tool.

It is therefore an objective of the invention to provide a novel method and apparatus of a hand tool that reduces the risk of injury to the user.

It is therefore an objective of the invention to provide a novel method and apparatus of a hand tool that enhance power application of a desired operation through increase torque and force that can be exerted by the user.

It is therefore an objective of the invention to provide a novel method and apparatus of a hand tool that increases the productivity of the user through increased power application of the hand tool without increased effort by the user.

It is also an objective of this invention to provide a hand tool's handle that is interchangeable among different hand tools of a hand tool set.

SUMMARY OF THE INVENTION

In one aspect of the invention, a garden tool apparatus comprising: a connector having a first end and a second end; a gardening utility apparatus connected to the first end; a rotating handle apparatus connected to the second end; the gardening utility apparatus.

In one aspect of the invention, the rotating hand apparatus is comprised of: a hand gripping apparatus suitable for human hand gripping and a hallow portion; a connector housing wherein the connector housing is attached to the second end of the rod; the connector housing is thereafter connected to the hallow portion. In another embodiment, the connector housing is connected to the second end wherein the connector is unable to rotate against the connector.

In another embodiment, the connector housing is freely rotational against the hallow portion. In another embodiment, a washer is inserted between the connector housing and the hallow portion.

In another embodiment, a ball bearing apparatus inserted between the connector housing and the hallow portion. In another embodiment, the washer is selected from a group consisting of steel washer, metal washer, rubber washer, plastic washer, silicon washer.

In another embodiment, the connector housing is comprised of an apertures wherein a securing device can be insert through the aperture to secure the connector to the connector housing.

In another embodiment, the connector housing is further comprised of an impediment device wherein the impediment device temporarily impedes rotation of the connector housing against the hallow portion. In another embodiment, the impediment device is comprised of a spring apparatus and a pin apparatus wherein the spring apparatus is positioned between the connector housing and the pin apparatus is positioned between the spring apparatus and a concave portion on the hallow portion. In another embodiment, the impediment device is disabled by applying rotation force onto the hand gripping apparatus.

In another embodiment, the gardening utility apparatus is selected from a group consisting of a shovel, a rake; a spade; a fork; an aerator; a weeder or a knife; a hoe.

In another aspect of the invention, A method to perform gardening task comprising: utilizing a garden tool apparatus wherein the garden tool apparatus is comprised of a connector having a first end and a second end; a gardening utility apparatus connected to the first end; a rotating handle apparatus to the second end. In one embodiment, the rotating hand apparatus is comprised of: a hand gripping apparatus suitable for human hand gripping and a hallow portion; a connector housing wherein the connector housing is attached to the second end of the rod; the connector housing is thereafter connected to the hallow portion.

In one embodiment, connector housing is connected to the second end wherein the connector is unable to rotate against the connector. In another embodiment, the connector housing is freely rotational against the hallow portion. In one embodiment, the washer is inserted between the connector housing and the hallow portion. In one embodiment, a ball bearing apparatus inserted between the connector housing and the hallow portion. In one embodiment, the washer is selected from a group consisting of steel washer, metal washer, rubber washer, plastic washer, silicon washer.

In one embodiment, the connector housing is comprised of an apertures wherein a securing device can be insert through the aperture to secure the connector to the connector housing.

In one embodiment, the connector housing is further comprised of an impediment device wherein the impediment device temporarily impedes rotation of the connector housing against the hallow portion. In one embodiment, the impediment device is comprised of a spring apparatus and a pin apparatus wherein the spring apparatus is positioned between the connector housing and the pin apparatus is positioned between the spring apparatus and a concave portion on the hallow portion. In one embodiment, the impediment device is disabled by applying rotation force onto the hand gripping apparatus.

In one embodiment, the gardening utility apparatus is selected from a group consisting of a shovel, a rake; a spade; a fork; an aerator; a weeder or a knife; a hoe.

Other features and advantages inherent in the device claimed and disclosed will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE INVENTION

Figure 1:
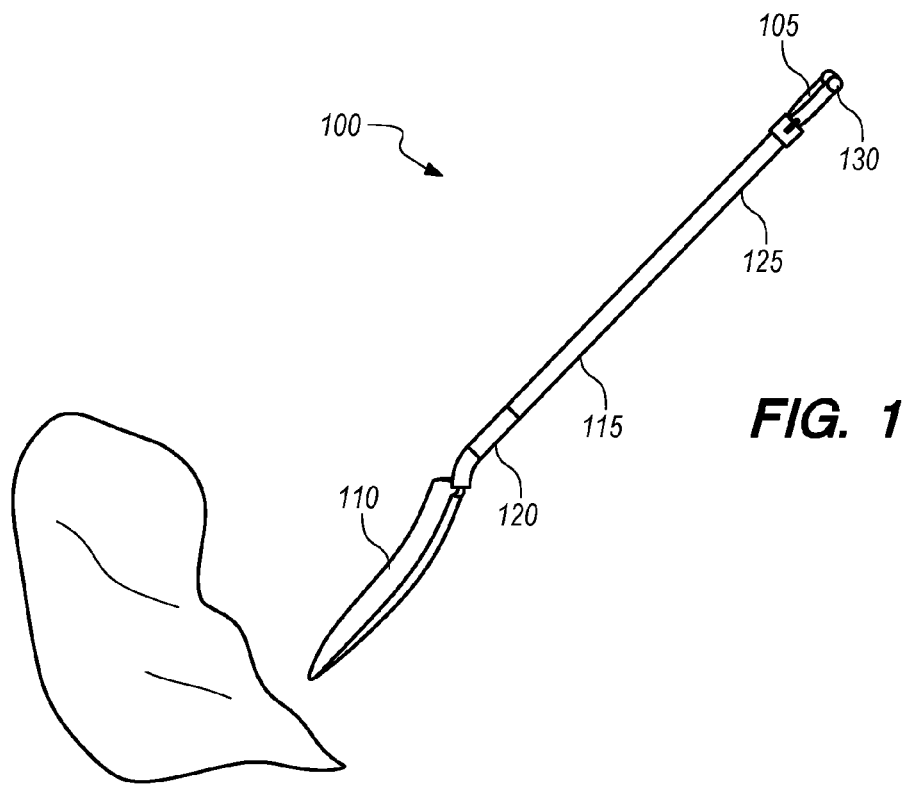
FIG. 1 is an illustration of a perspective view of one embodiment of the hand tool device of the present invention.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shots, figures, and the detailed descriptions thereof, are to be regarded as illustrative in nature and not restrictive. Also, the reference or non-reference to a particular embodiment of the invention shall not be interpreted to limit the scope of the invention.

In accordance with the method and apparatus of the invention disclosed herein, the present invention is an improved hand tool for gardening wherein the rotational handle may be adjusted at least between 15 degrees to 125 degrees with a releasable locking mechanism to allow a user to use and perform operations while minimizing the risk of injury and increasing comfort and productivity. In one embodiment, the rotation handle can rotate 360 degrees. In another embodiment, the releasable locking mechanism allows the rotational handle to rotate 45 degrees at a time. In another embodiment, the releasable locking mechanism allows the rotational handle to rotate 30 degrees at a time. In another embodiment, the releasable locking mechanism allows the rotational handle to rotate 15 degrees at a time. Specifically, the hand tool device provides for a rotational handle, which can adjust to the varying needs of the user, which will create less strain on the hand, wrist, and arm. This is because functional capabilities of the hands are important for work efficiency. Hands require a certain level of strength and precision, depending on the type of task being performed. The right combination of strength and precision in handling the task involves a delicate management of the sensory system of the hand. Therefore, the present invention takes into consideration the anatomical and physiological characteristics of the hand by providing a rotational handle that can adjust to the user's anatomical and physiological needs depending on the task the user is seeking to accomplish.

In particular, there is a pin with spring on the surface of the male component and sink holes on the inside bottom part of the female component. This pin with spring and sink holes combination provide the utility hand tool to be adjustable according to the user's grip. However, in order to prevent too much or too little rotation, a locking mechanism is important. Locking mechanisms are often pivotally connected to a handle and spring-based to engage in the locking recesses in order to turn a handle into various operating positions. Locking mechanisms not only give rotational handles stability, but may also provide security, which is very important for safe tool operation.

The ease of using this hand tool enhances power application by creating a favorable angle between the ground and the point of entry of the hand tool into the ground to allow a user to perform operations with less effort. The utility hand tool of the invention disclosed herein is designed for people who have different opening angle between their palm and arm, as the difference can vary between 75 to 180 degrees. In fact, the design of the handle itself and the handle relative to the rest of the tool can greatly impact the power application of the hand tool. Specifically, the angulation of handles may be necessary for tools to maintain a straight wrist in order to prevent injury and to improve power applications. The handle should reflect the axis of the grasp, which is generally 78 degrees from the horizontal, and should be oriented in order that the eventual tool axis is in line with the index finger.

Optimum tool angle depends on the posture of the user. The amount of torque and force that can be exerted also depends on the working posture. For example, repetitive screw driving should be done on a horizontal surface above the elbow, and push or pull should be done in the direction of the forearm, with the handle directly in front of it. Therefore, the ability to change the angle of the hand tool can be of great importance in providing for more torque or force and to minimize or eliminate injury and discomfort.

Notably, the present invention is suitable for utility hand tools for both left-handed and right-handed individuals. The preferred hand, also known as the "dominant hand," is the right hand for about 90% of the population and the percentage appears constant across cultures and for both sexes. Non-preferred hand tends to have approximately 94% of the grip strength of the preferred hand. Thus, for a hand tool that is usable in either hand, the ability to rotationally adjust the angle of the hand tool allows for the hand tool to adapt to the users hands when they switch hands rather than having the users' hands adapt to the tool.

As an example, when holding a bow saw, many users have found that when their hand and grip is at a 90 degree angle as opposed to holding it horizontally as with regular bow saws, the pushing and pulling of the bow saw is much more effective when the user is able to turn the handle to the 90 degree angle. At the optimal angle and with a better grip, the user is able to produce a much larger force while placing less stress on the arm and hand of the user. This angle may be different for every individuals, but since the handle can be adjusted, each individual user can adjust the handle to their optimal angle to prevent injury while also improving their productivity.

FIG. 1 is an illustration of a perspective view of one embodiment of the hand tool device 100 of the present invention. The hand tool device 100 may comprise a rotational handle 105, a garden tool 110, at least one connector 115 with a first end 120 and a second end 125. The garden tool 110 may be constructed of an alloy, metal composite, or other strong rigid material. The garden tool 110 may be attached to the connector 115 at the first end 120. The rotational handle 105 may be attached to the connector 115 at the second end 125. The rotational handle 105 may rotate at least between 15 degrees to 125 degrees wherein the rotational handle 105 is selectively actuated in response to a rotating action upon the rotational handle 105. The rotational handle 105 may comprise a grabbing means 130 for manipulating the rotational handle 105. The axis of the grabbing means 130 may be perpendicular to the axis of the connector 115. The hand tool device 100 may comprise of semi-permanent or permanent parts wherein the parts may be connected to each other by means of screwing, pinning, or but not limited to, a locking mechanism that will maintain the structural integrity of the hand tool device.

Figure 2:
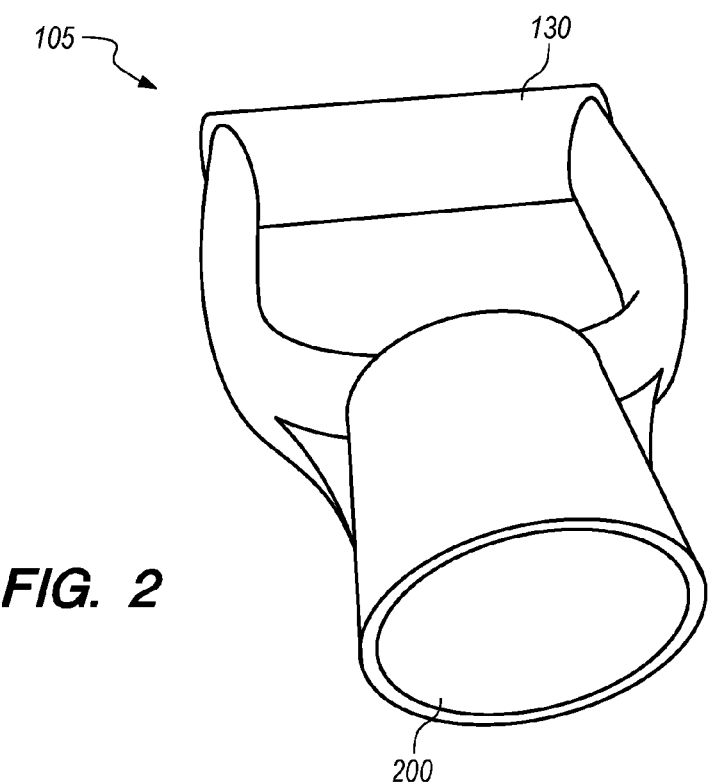
FIG. 2 is an illustration of a perspective view of the rotational handle.

FIG. 2 is an illustration of a perspective view of the rotational handle 105. The rotational handle 105 may comprise a grabbing means 130 for manipulating the handle and at least one hollow portion 200. The hollow portion 200 may be continuously attached to the grabbing means 130. The hollow portion 200 may house the connector housing. The rotational handle 105 may comprise of semi-permanent or permanent parts wherein the parts may be connected to each other by means of screwing, pinning, or but not limited to, a locking mechanism that will maintain the structural integrity of the rotational handle 105.

Figure 3:
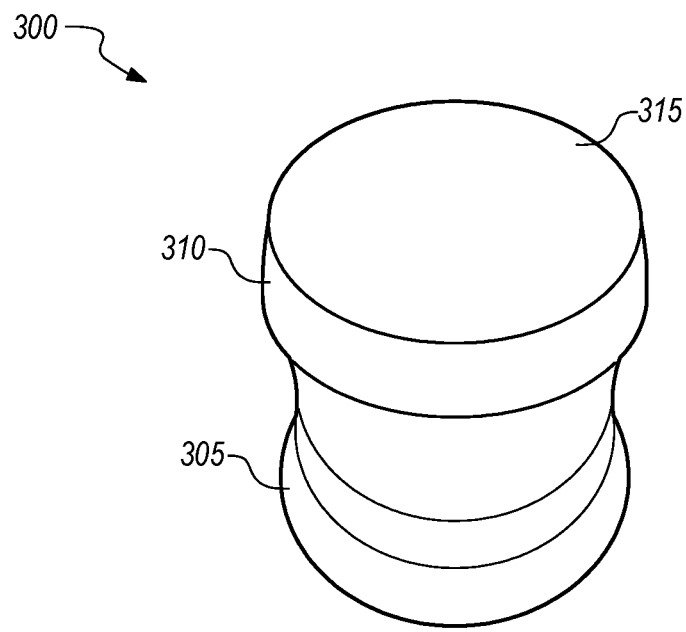
FIG. 3 is an illustration of a perspective view of the connector housing.

FIG. 3 is an illustration of a perspective view of the connector housing 300. The connector housing 300 may comprise a first end 305 and a second end 310. The first end 305 of the connector housing 300 may comprise of at least one inlet for housing the connector. The second end 310 of the connector housing 300 may comprise of at least one planar surface 315 for alignment with a washer. The connector housing 300 may be connected to other parts of the rotational handle by means of screwing, pinning, or but not limited to, a locking mechanism that will maintain the structural integrity of the connector housing 300.

Figure 4:
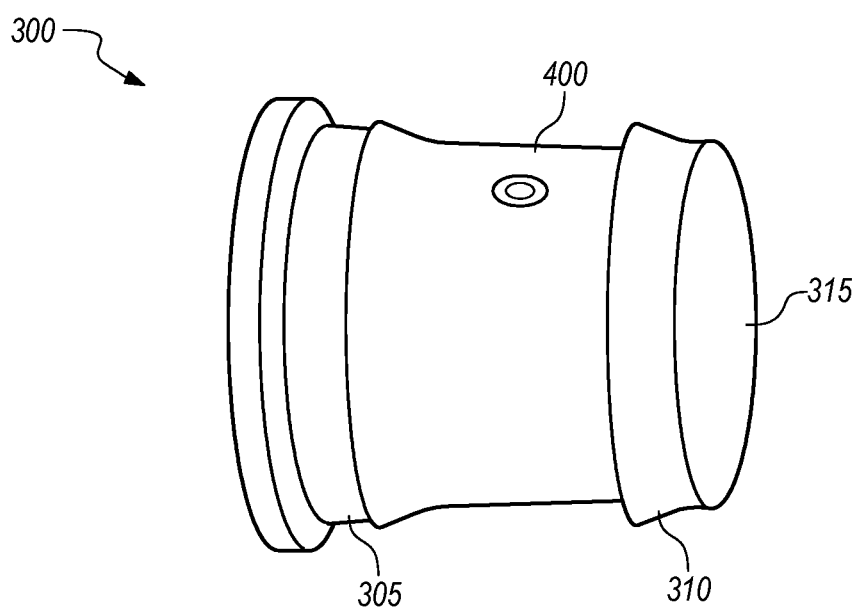
FIG. 4 is an illustration of a perspective view of the connector housing.

FIG. 4 is an illustration of a perspective view of the connector housing 300. The connector housing 300 may comprise a first end 305, a second end 310, and at least one release mechanism 400. The first end 305 of the connector housing 300 may comprise of at least one inlet for housing the connector. The second end 310 of the connector housing 300 may comprise of at least one planar surface 315 for alignment with a washer. The release mechanism 400 allows the connector housing to be connected to other parts of the rotational handle by means of screwing, pinning, or but not limited to, a locking mechanism that will maintain the structural integrity of the connector housing 300.

Figure 5:
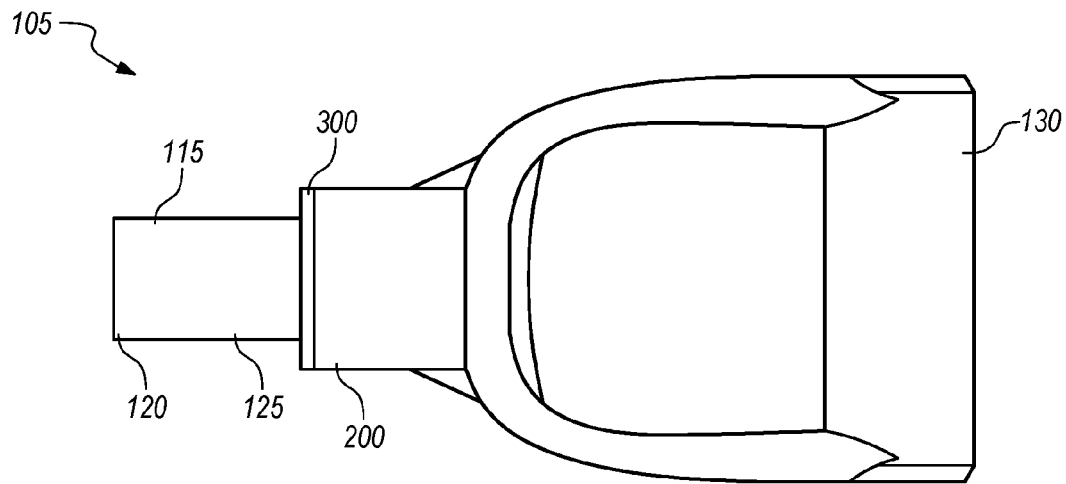
FIG. 5 is an illustration of a perspective view of the rotational handle.

FIG. 5 is an illustration of a perspective view of the rotational handle 105. The rotational handle 105 may comprise a grabbing means 130 for manipulating the handle, at least one hollow portion 200, and at least one connector housing 300. The rotational handle 105 may be attached to the second end 125 of the connector 115. The axis of the grabbing means 130 for manipulating the rotational handle 105 may be perpendicular to the axis of the connector 115. The hollow portion 200 may be continuously attached to the grabbing means 130. The hollow portion 200 may house the connector housing 300. The connector housing 300 may comprise of at least one inlet for housing the second end 125 of the connector 115. The rotational handle 105 may comprise of semi-permanent or permanent parts wherein the parts may be connected to each other by means of screwing, pinning, or but not limited to, a locking mechanism that will maintain the structural integrity of the rotational handle 105.

Figure 6:
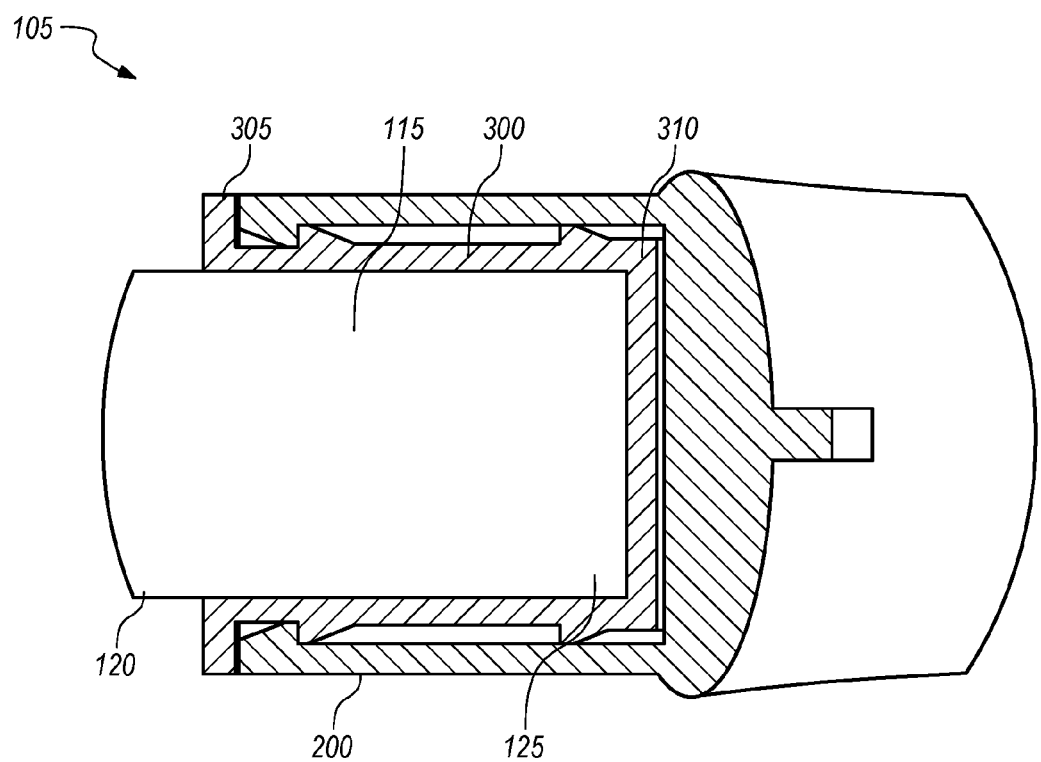
FIG. 6 is an illustration of a perspective view of the rotational handle.

FIG. 6 is an illustration of a perspective view of the rotational handle 105. The rotational handle 105 may comprise at least one hollow portion 200 and at least one connector housing 300 with a first end 305 and a second end 310. The rotational handle 105 may be attached to the second end 125 of the connector 115. The hollow portion 200 of the rotational handle 105 may be for housing the connector housing 300 and the connector 115. The first end 305 of the connector housing 300 may comprise of at least one inlet for housing the second end 125 of the connector 115. The second end 310 of the connector housing 300 may comprise of at least one planar surface 315 for alignment with a washer. The rotational handle 105 may comprise of semi-permanent or permanent parts wherein the parts may be connected to each other by means of screwing, pinning, or but not limited to, a locking mechanism that will maintain the structural integrity of the rotational handle 105.

Figure 7:
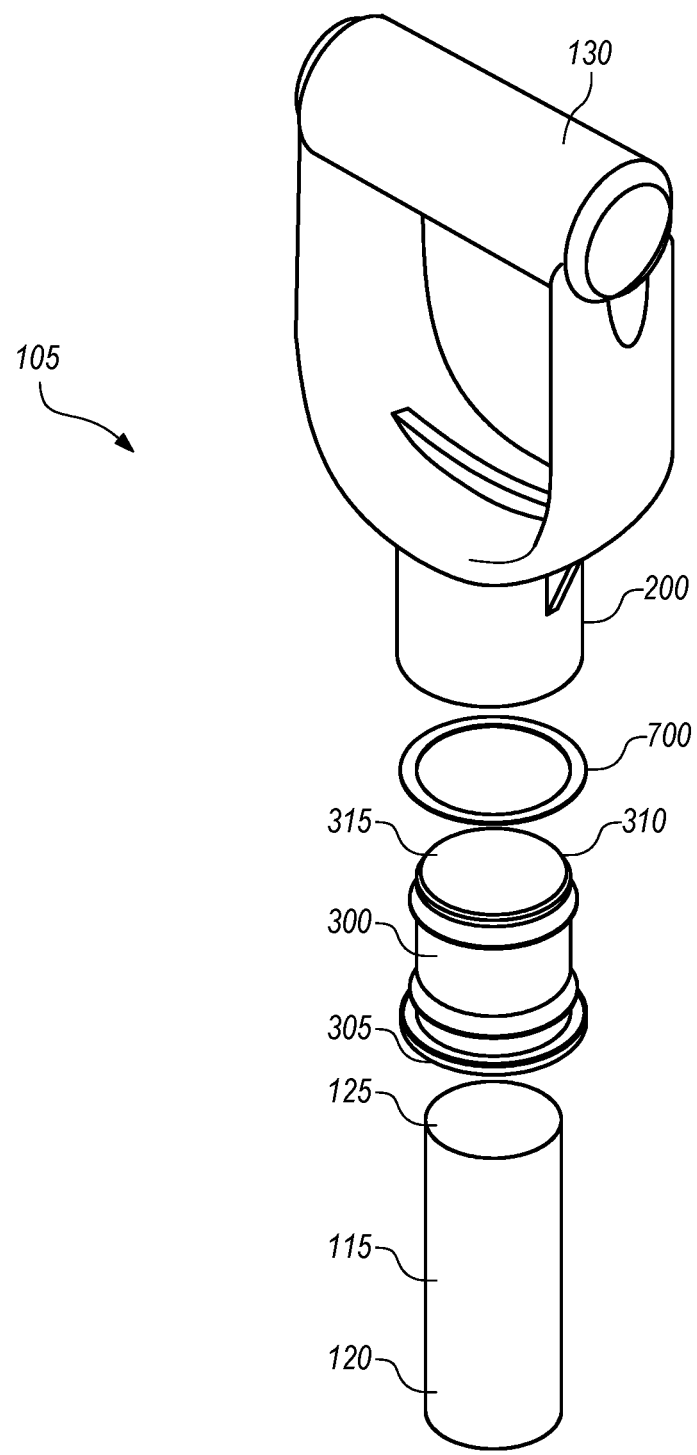
FIG. 7 is an illustration of a perspective view of the rotational handle assembly.
Figure 8A:
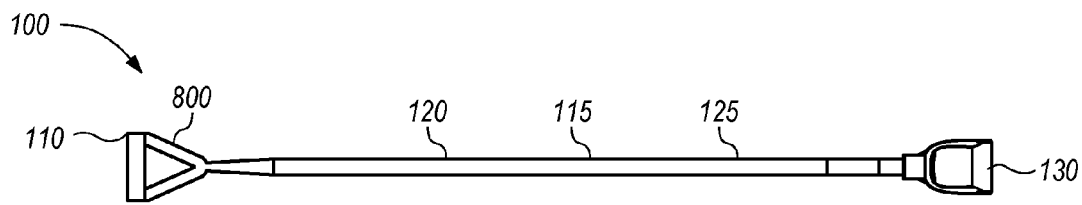
FIG. 8a is an illustration of a perspective view of hand tool device showing a hoe as a garden tool portion.
Figure 8B:
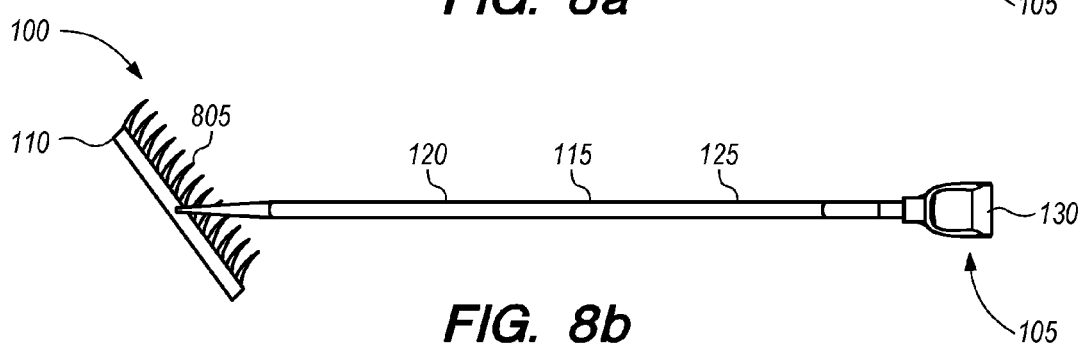
FIG. 8b is an illustration of a perspective view of hand tool device showing a rake as a garden tool portion.
Figure 8C:
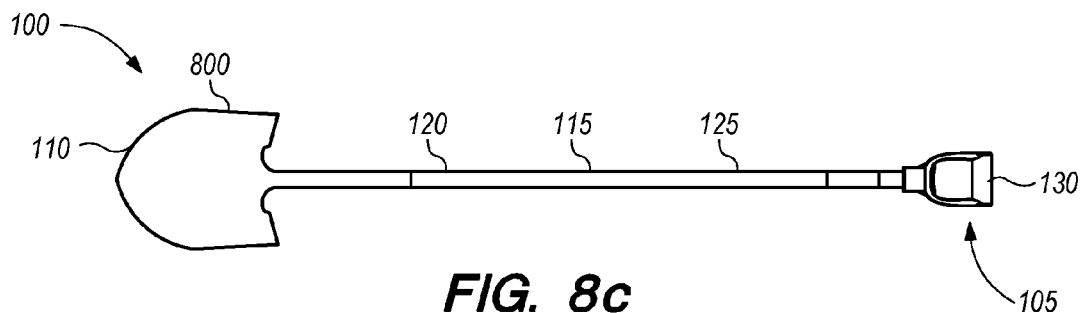
FIG. 8c is an illustration of a perspective view of hand tool device showing a shovel as a garden tool portion.
Figure 8D:
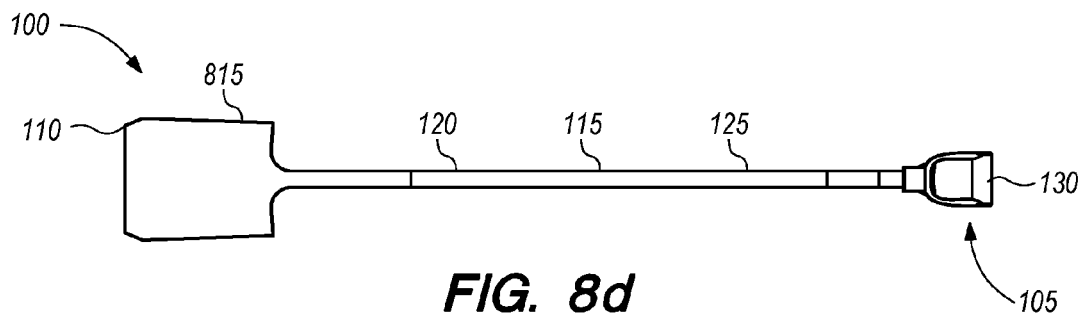
FIG. 8d is an illustration of a perspective view of hand tool device showing a spade as a garden tool portion.
Figure 9A:
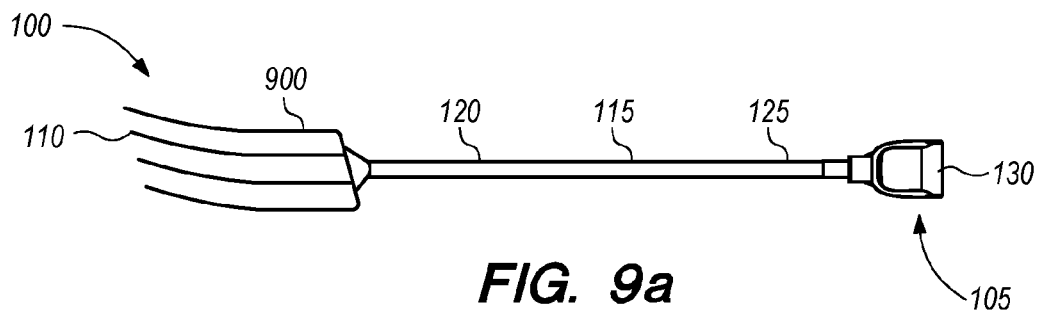
FIG. 9a is an illustration of a perspective view of hand tool device showing a fork as a garden tool portion.
Figure 9B:
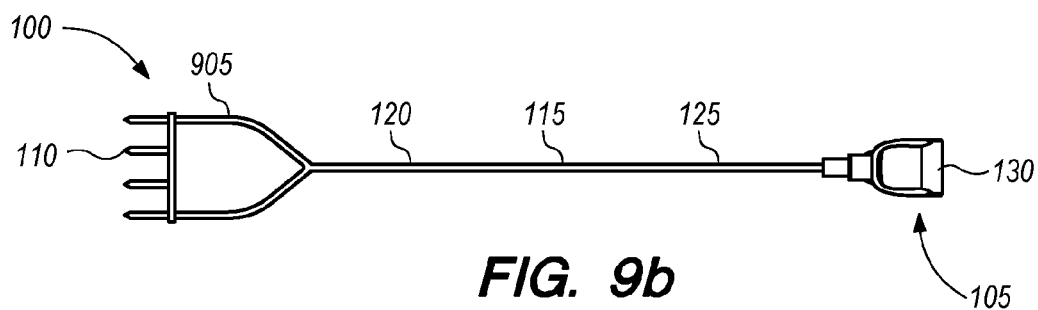
FIG. 9b is an illustration of a perspective view of hand tool device showing an aerator as a garden tool portion.
Figure 9C:
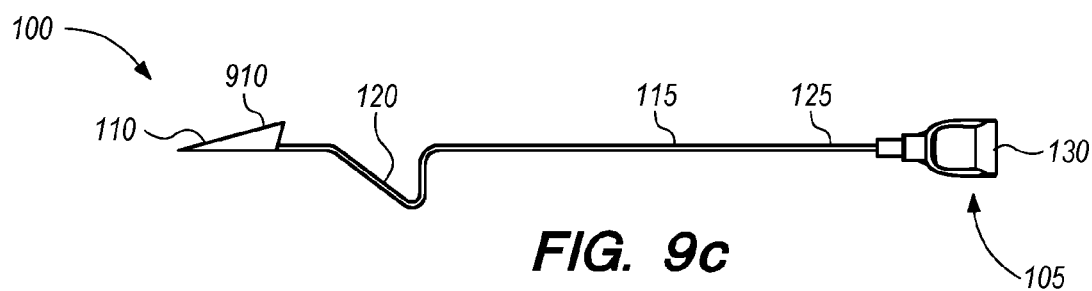
FIG. 9c is an illustration of a perspective view of hand tool device showing a weeder as a garden tool portion.
Figure 9D:
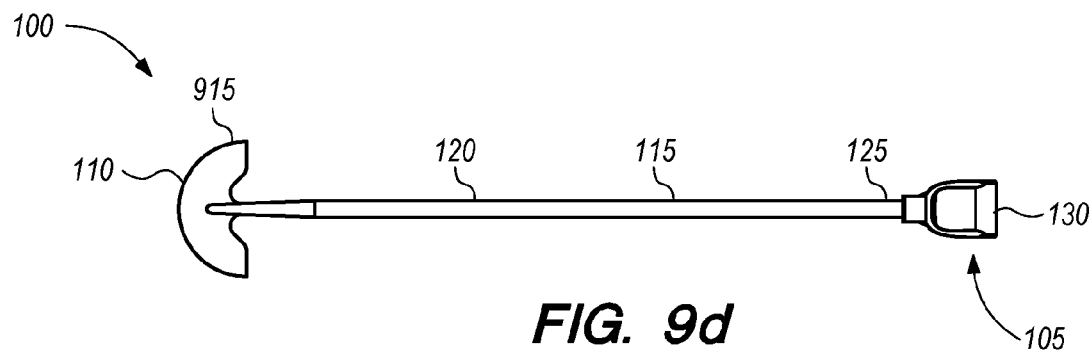
FIG. 9d is an illustration of a perspective view of hand tool device showing a knife as a garden tool portion.

FIG. 7 is an illustration of a perspective view of the rotational handle 105 assembly. The rotational handle 105 may comprise a grabbing means 130 for manipulating the handle, at least one hollow portion 200, at least one connector housing 300 with a first end 305 and a second end 310, and at least one washer 700. The rotational handle 105 may be attached to the second end 125 of the connector 115. The grabbing means 130 for manipulating the rotational handle 105 may be axis of the perpendicular to the axis of the connector 115. The hollow portion 200 may be integrated to the grabbing means 130. The hollow portion 200 may be perpendicular to the grabbing means 130. The hollow portion 200 may house the connector housing 300, the connector 115, and the washer 700. The first end 305 of the connector housing 300 may comprise of at least one inlet for housing the second end 125 of the connector 115. The second end 310 of the connector housing 300 may comprise of at least one planar surface 315 for alignment with the washer 700. The rotational handle 105 may comprise of semi-permanent or permanent parts wherein the parts may be connected to each other by means of screwing, pinning, or but not limited to, a locking mechanism that will maintain the structural integrity of the rotational handle 105.

FIGS. 8a-8d are illustrations of a perspective view of a hand tool device 100 showing various garden tools 110. The hand tool device 100 may comprise a rotational handle 105, a garden tool 110, at least one connector 115 with a first end 120 and a second end 125. The garden too 110 may be in the form of, but not limited to, a hoe 800, a rake 805, a shovel 810, or a spade 815. The garden tool 110 may be constructed of an alloy, metal composite, or other strong rigid material. The garden tool 110 may be attached to the connector 115 at the first end 120. The rotational handle 105 may be attacked to the connector 115 at the second end 125. The rotational handle 105 may rotate at least between 15 degrees to 125 degrees wherein the rotational handle 105 may be selectively actuated in response to a rotating action upon the rotational handle 105. The rotational handle 105 may comprise a grabbing means 130 for manipulating the rotational handle 105. The grabbing means 130 may be parallel to the connector 115. The hand tool device 100 may comprise of semi-permanent or permanent parts wherein the parts may be connected to each other by means of screwing, pinning, or but not limited to, a locking mechanism that will maintain the structural integrity of the hand tool device 100.

FIGS. 9a-9d are illustrations of a perspective view of a hand tool device 100 showing various garden tools 110. The hand tool device 100 may comprise a rotational handle 105, a garden tool 110, at least one connector 115 with a first end 120 and a second end 125. The garden tool 110 may be in the form of, but not limited to, a fork 900, an aerator 905, a weeder 910, or a knife 915. The garden tool 110 may be constructed of an alloy, metal composite, or other strong rigid material. The garden tool 110 may be attached to the connector 115 at the first end 120. The rotational handle 105 may be attacked to the connector 115 at the second end 125. The rotational handle 105 may rotate at least between 15 degrees to 125 degrees wherein the rotational handle 105 may be selectively actuated in response to a rotating action upon the rotational handle 105. The rotational handle 105 may comprise a grabbing means 130 for manipulating the rotational handle 105. The grabbing means 130 may be perpendicular to the connector 115. The hand tool device 100 may comprise of semi-permanent or permanent parts wherein the parts may be connected to each other by means of screwing, pinning, or but not limited to, a locking mechanism that will maintain the structural integrity of the hand tool device 100.

Figure 10:
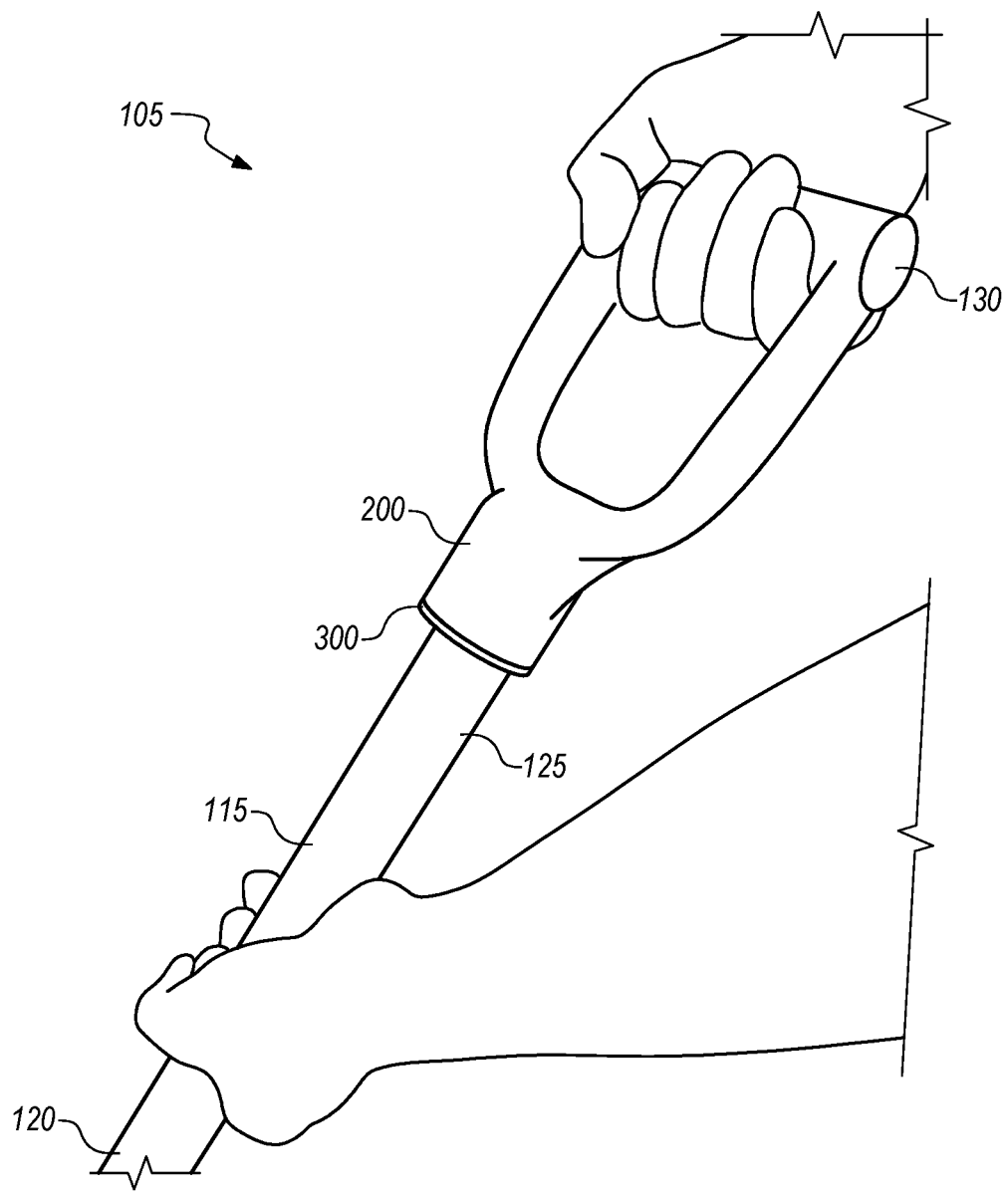
FIG. 10 is an illustration of a perspective view of the rotational handle.

FIG. 10 is an illustration of a perspective view of the rotational handle 105. The rotational handle 105 may comprise a grabbing means 130 for manipulating the handle, at least one hollow portion 200, and at least one connector housing 300. The rotational handle 105 may be attached to the second end 125 of the connector 115. The grabbing means 130 for manipulating the rotational handle 105 may be perpendicular to the connector 115. The hollow portion 200 may be continuously attached to the grabbing means 130. The hollow portion 200 may house the connector housing 300. The connector housing 300 may comprise of at least one inlet for housing the second end 125 of the connector 115. The rotational handle 105 rotate about the connector 115 at least between 15 degrees to 125 degrees. The rotational handle 105 may comprise of semi-permanent or permanent parts wherein the parts may be connected to each other by means of screwing, pinning, or but not limited to, a locking mechanism that will maintain the structural integrity of the rotational handle 105.

Figure 11:
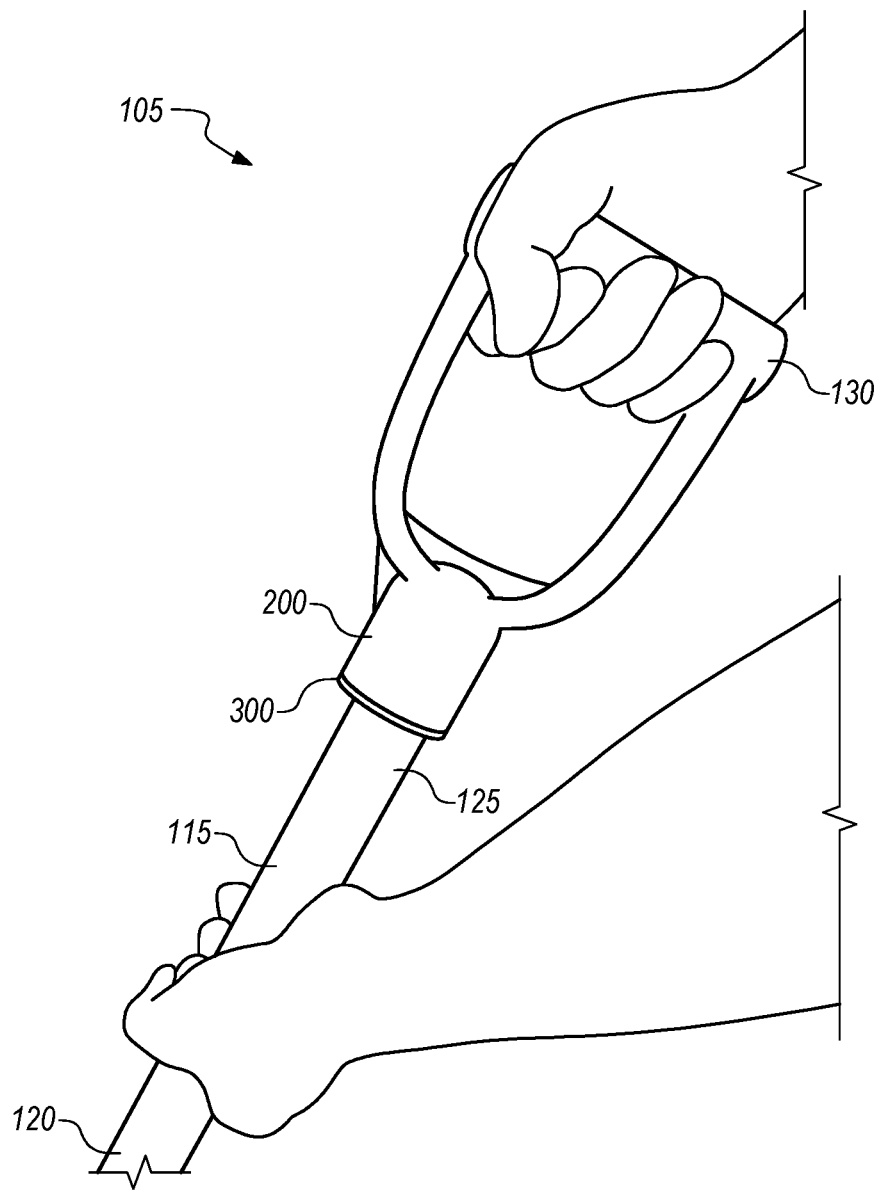
FIG. 11 is an illustration of a perspective view of the rotational handle.

FIG. 11 is an illustration of a perspective view of the rotational handle 105. The rotational handle 105 may comprise a grabbing means 130 for manipulating the handle, at least one hollow portion 200, and at least one connector housing 300. The rotational handle 105 may be attached to the second end 125 of the connector 115. The axis of the grabbing means 130 for manipulating the rotational handle 105 may be perpendicular to the axis of connector 115. The hollow portion 200 may be continuously attached to the grabbing means 130. The hollow portion 200 may house the connector housing 300. The connector housing 300 may comprise of at least one inlet for housing the second end 125 of the connector 115. The rotational handle 105 rotate about the connector 115 at least between 15 degrees to 125 degrees. The rotational handle 105 may comprise of semi-permanent or permanent parts wherein the parts may be connected to each other by means of screwing, pinning, or but not limited to, a locking mechanism that will maintain the structural integrity of the rotational handle 105.

Figure 12:
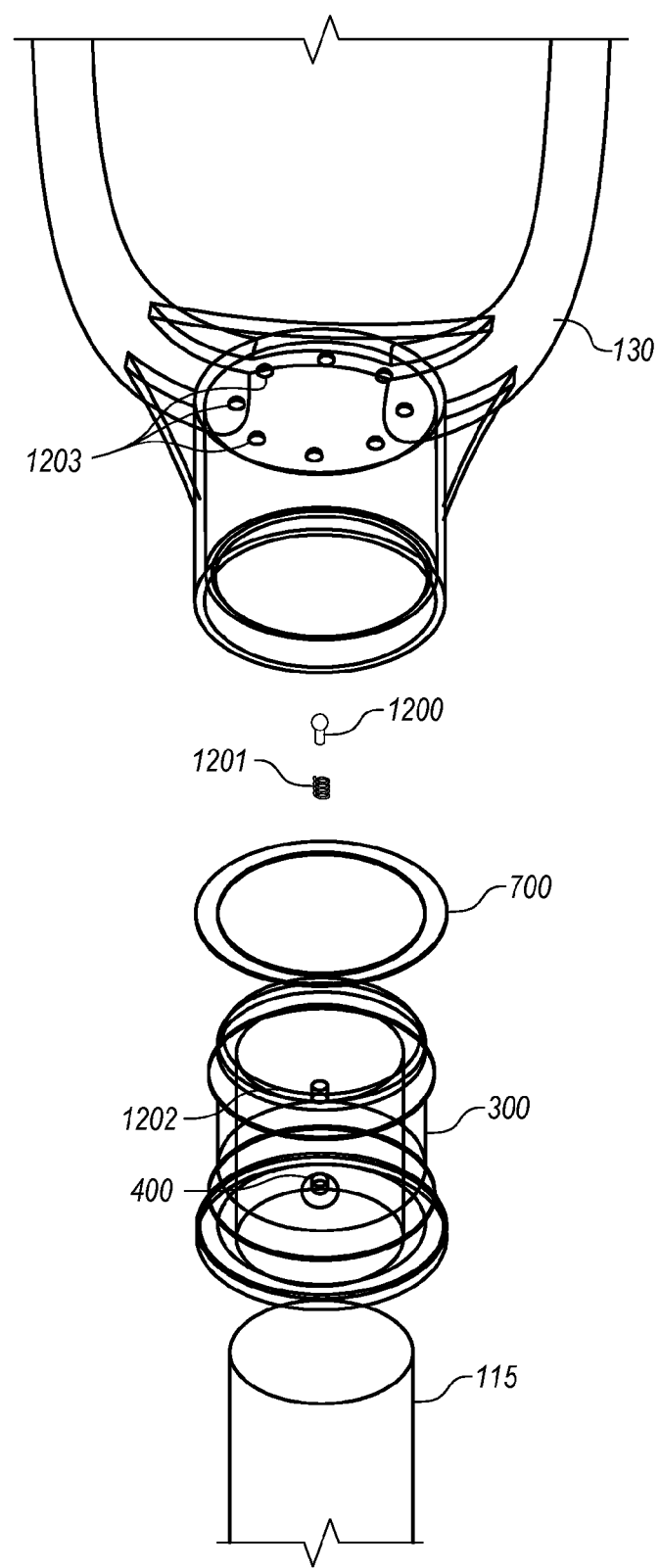
FIG. 12 is an illustration of an exploded, air view of the rotational handle.

FIG. 12 is an illustration of an exploded, air view of another embodiment of a rotational handle 105 assembly as disclosed herein. The rotational handle 105 may comprise a grabbing means 130 for manipulating the handle, at least a pin 1200, a spring 1201, a pin securing hole 1202, and multiple sink holes 1203, and at least a washer 700, one connector housing 300, and a connector 115. The axis of the grabbing means 130 for manipulating the rotational handle 105 may be perpendicular to the axis of the connector 115. The pin 1200 and the spring 1201 is secured to the connector housing 300 through the pin securing hole 1202. The pin 1200 and the spring 1201 provide the rotational handle 105 with the mechanism to be rotated and adjusted according to the need of the user. There are multiple sink holes 1203 on the grabbing means 130 for providing a locking mechanism using the pin 1200 and the sink holes 1203. The pin 1200 is sunk into one of the sink holes 1203 to lock in the desired angle for the hand tool. The release mechanism 400 allows the pin 1200 to be disengaged from the sink holes 1203, thereby allowing the handle to be rotated to the desired angle.

Figure 13:
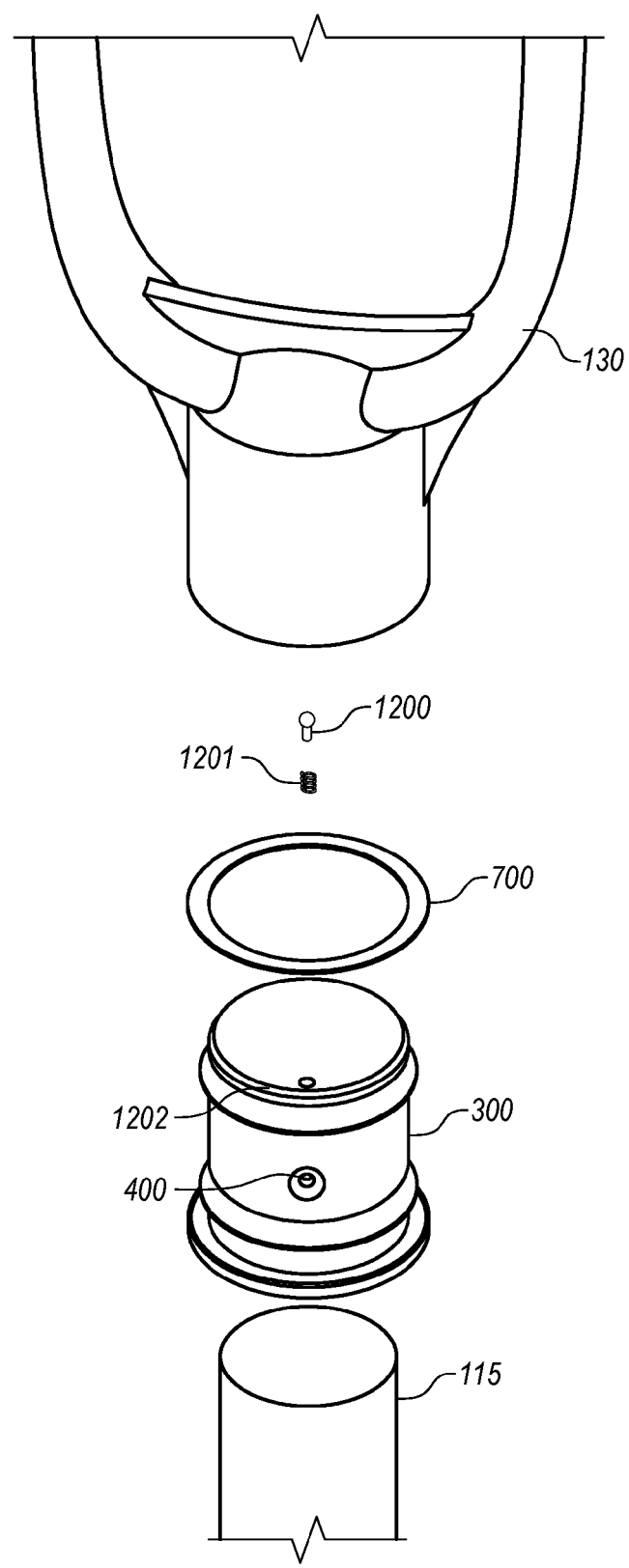
FIG. 13 is an illustration of an exploded view of the rotational handle.

FIG. 13 is an illustration of an exploded view of another embodiment of a rotational handle 105 assembly as disclosed herein. FIG. 13 is similar to FIG. 12 with the exception that FIG. 13 is a regular view of the rotational handle assembly and FIG. 12 is a see-through view of the rotational handle assembly. As discussed above, the rotational handle 105 may comprise a grabbing means 130 for manipulating the handle, at least a pin 1200, a spring 1201, and a pin securing hole 1202, multiple sink holes 1203, and at least a washer 700, one connector housing 300, and a connector 115. The axis of the grabbing means 130 for manipulating the rotational handle 105 may be perpendicular to the axis of the connector 115. The pin 1200 and the spring 1201 is secured to the connector housing 300 through the pin securing hole 1202. The pin 1200 and the spring 1201 provide the rotational handle 105 with the mechanism to be rotated and adjusted according to the need of the user. There are multiple sink holes 1203 on the grabbing means 130 for providing a locking mechanism using the pin 1200 and the sink holes 1203. The pin 1200 is sunk into one of the sink holes 1203 to lock in the desired angle for the hand tool. The release mechanism 400 allows the pin 1200 to be disengaged from the sink holes 1203, thereby allowing the handle to be rotated to the desired angle.

Figure 14:
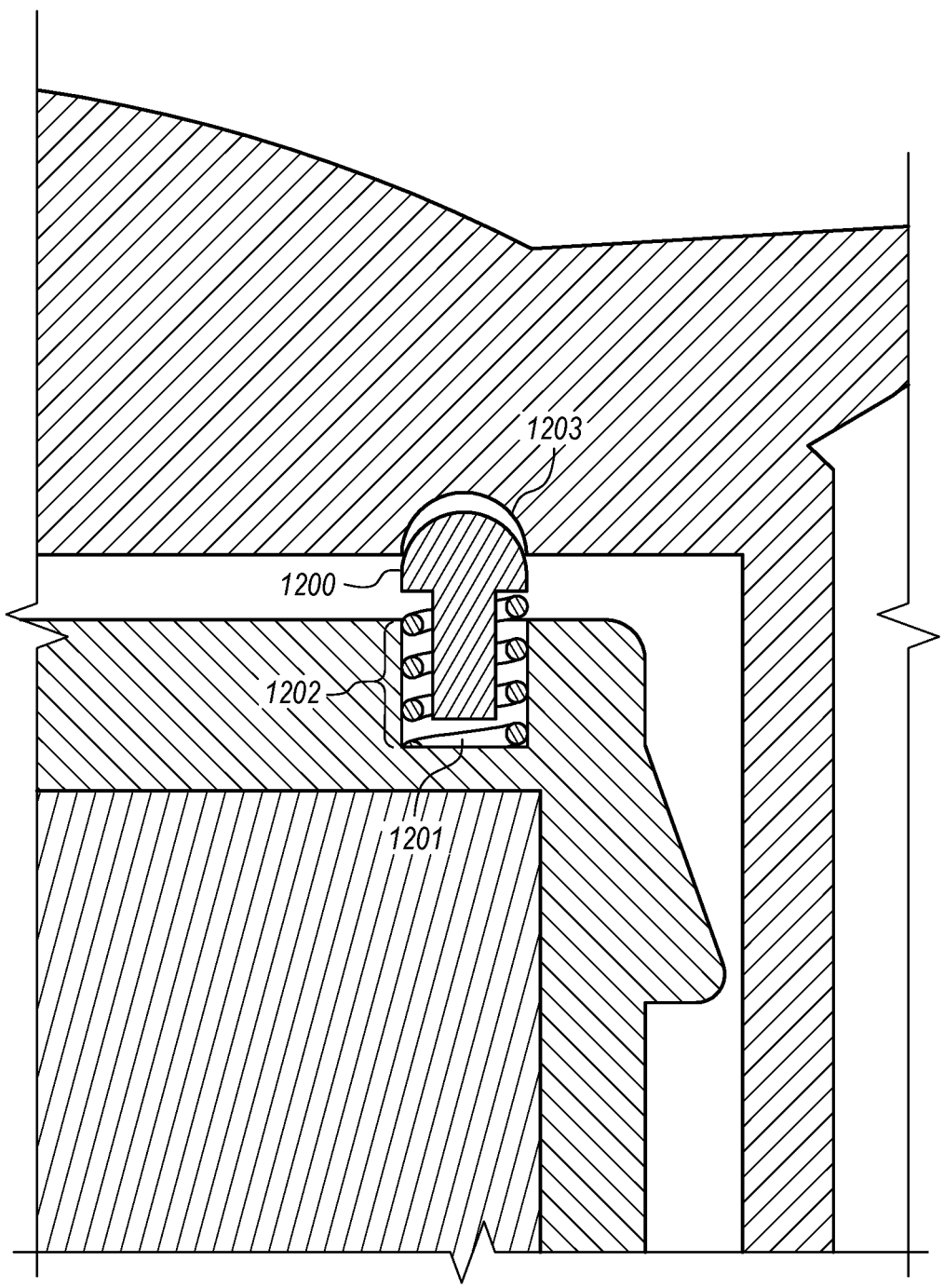
FIG. 14 is an illustration of a close-up view of the pin and sink hole mechanism for the rotational handle.

FIG. 14 is an illustration of a close-up view of the pin 1200 and sink hole 1203 locking mechanism for that rotational handle assembly. As shown, the pin 1200, secured in the pin securing hole 1202, is pushed by the spring 1201 and is decompressed into the sink hole 1203. By compressing the spring 1201, the pin 1200 can be released from the sink hole 1203, allowing the handle to be rotated to the desired angle according to the application of the hand tool.

Figure 15:
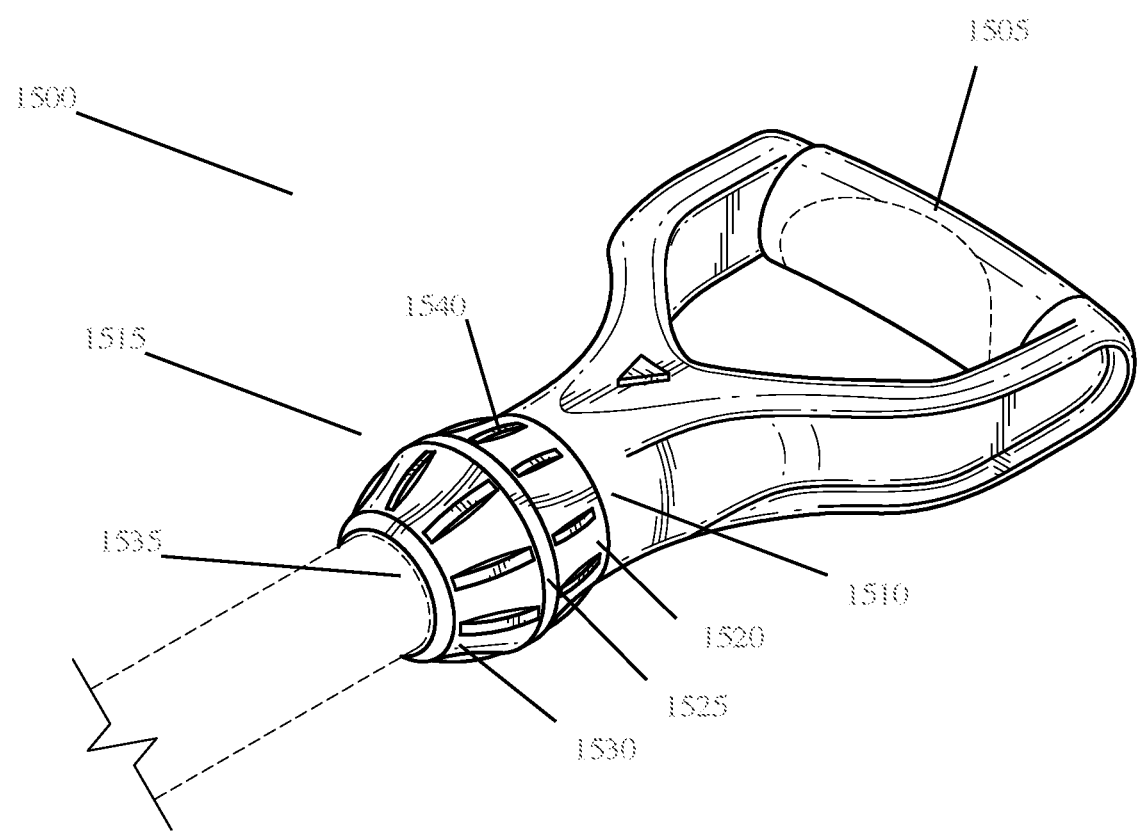
FIG. 15 is an illustration of a perspective view of another embodiment of the rotational handle.

FIG. 15 is an illustration of a perspective view of another embodiment of the rotational handle 1500. In this embodiment, the rotational handle 1500 comprises a D-shaped grip 1505 for manipulating the handle, at least one hollow portion 1510, and at least one connector housing 1515. The connector housing 1515 comprises a first end opening 1520, a middle portion 1525, and a second end opening 1530. The hollow portion 1510 is continuously attached to the D-shaped grip 1505. The interior of the hollow portion 1510 partially houses at least one rotatable apparatus. The exterior wall of the hollow portion may matingly engage with the first end opening 1520 of the connector housing 1515. To provide the user with a better grab while attaching the D-shaped grip to the connector housing, several grab tabs 1540 are disposed on the exterior wall of the connector housing 1515 around the first and second end openings 1520 and 1530. One end 1535 of the shovel's shaft is disposed through the second end opening 1530 and preferably attached to the rotatable apparatus disposed inside the connector housing 1515 and the hollow portion 1510. Preferably, the connector housing may be able to rotate against the shaft in fifteen degree increments. It is appreciated that the second end opening 1530 perimeter is made to fit the perimeter of the shovel's shaft, which is smaller than the inner perimeter of the middle portion 1525 and the first end opening 1520. The inner perimeters of the middle portion 1525 and first end opening 1520 are made larger to receive the shaft and the connector and rotatable apparatus. The rotational handle 1500 may comprise of semi-permanent or permanent parts wherein the parts may be connected to each other by means of screwing, pinning, or but not limited to, a locking mechanism that will maintain the structural integrity of the rotational handle 1500.

Figure 16:
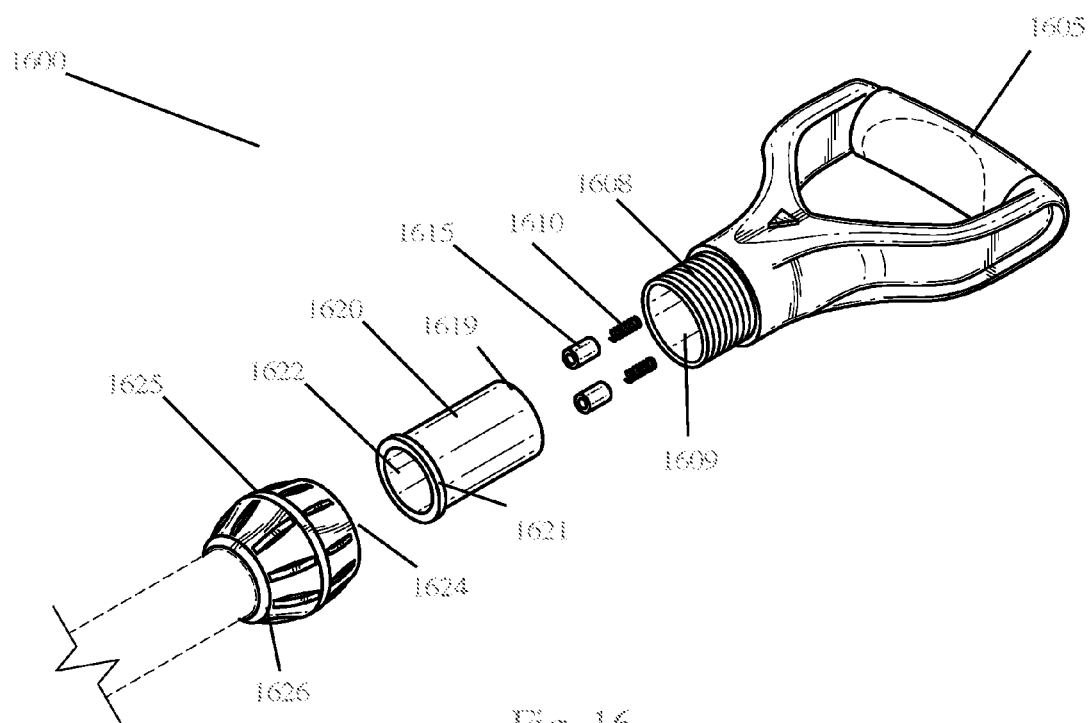
FIG. 16 is an illustration of an exploded perspective view of another embodiment of the rotational handle.

FIG. 16 is an illustration of an exploded perspective view of another embodiment of the rotational handle. The rotational handle 1600 comprises a D-shaped grip 1605 for manipulating the handle, one or more springs 1610, one or more pins 1615, at least one connector and rotatable apparatus 1620, and at least one connector housing 1625, which has a first end opening 1624 and a second end opening 1626, which are similarly disclosed in previous embodiments. The connector and rotatable apparatus 1620 comprises a first end 1619 and a second end 1622. The second end 1622 is open to receive one end of the shovel's shaft. A ring 1621 is disposed on the rim of the second end 1622. The ring 1621 has a larger outer perimeter than that of the second end 1622. The ring's larger outer perimeter is also larger than the inner perimeter of the second end opening 1626 of the connector housing 1625. The first end 1619 is sealed in this embodiment. When fully assembled, the end of the shovel's shaft is disposed through the connector housing's second end opening 1626 and the second end's opening of the connector and rotatable apparatus 1620, and fits snugly inside the connector and rotatable apparatus 1620. The exterior circular face of the first end 1619 of the connector apparatus 1620, the pins 1615, the springs 1610, and the interior of the hollow portion 1609 of the handle press against each other in turn. The first end 1619 and the interior of the hollow portion 1609 sandwich the pins and springs. To keep the whole assembly from springing apart, the D-shaped grip portion of the handle is screwed into the first end opening 1624 of the connector housing 1625. This is achieved by mating threads, male threads 1608 on the exterior wall of the hollow portion 1609 and female threads on the inner perimeter of the first end opening 1624 of the connector housing 1625. It is appreciated that there are other attachment mechanisms to achieve the same effect, such as tabs and L-shaped gaps in a push-and-turn mechanism. Furthermore, as disclosed above, because the end opening 1626 inner perimeter is smaller than the outer perimeter of the ring 1621, disposed on the rim of the rotatable connector apparatus 1620, the end opening 1626 keeps the connector apparatus 1620 within the connector housing 1625. It lets the shovel's shaft through but keeps the shaft sitting inside the connector apparatus 1620 from coming loose from the connector housing 1625. In this assembly, the shovel's shaft and the handle are kept somewhat rigid along the longitudinal axis because of the springs' force pressure, but are freely rotatable. To avoid undesired rotation, there are multiple sink holes disposed on the exterior circular face of the first end 1619 of the connector apparatus 1620 for providing a locking mechanism using the pins 1615. The sink holes are disposed along the perimeter of the first end 1619 in such a manner to allow 15 degree increment rotation. To rotate the handle against the shaft, the user must apply a larger rotational force than the friction force created by the pins, pushed by the springs, pressing against the first end 1619 of the connector apparatus 1620. Also, the user's rotational force must be able to push the pins and springs out of their straightened positions so the pins can move out of the current sink holes to the next sink holes.

Figure 17:
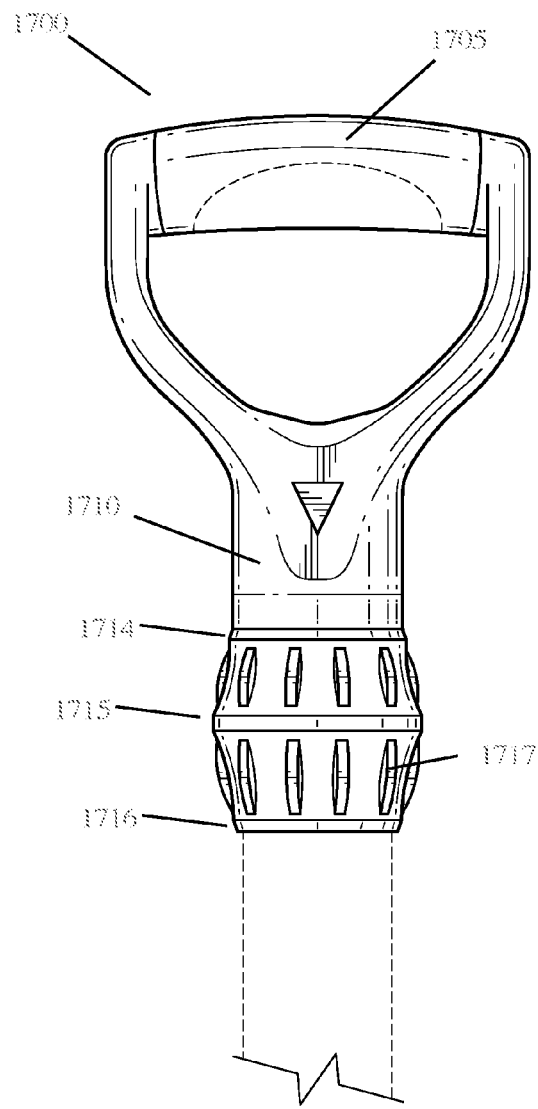
FIG. 17 is an illustration of front view of another embodiment of the rotational handle.

FIG. 17 is a front view of another embodiment of the fully assembled rotational handle. As disclosed above, the rotational handle 1700 comprises a D-shaped grip 1705 for manipulating the handle, a hollow portion 1710, and a connector housing 1715 that houses the connector apparatus inside. As disclosed above, the D-shaped grip 1705 and the hollow portion 1710 are continuously attached. The hollow portion 1710, in turn, is screwed into the first end opening of the connector housing 1715 to form a unit of a rotational handle of the current invention. As disclosed earlier, a connector apparatus is enclosed inside the connector housing, and, since the connector apparatus holds one end of the shovel's shaft, this end of the shaft is also held inside the connector housing, and, thus, the rotational handle is connected with the rest of the shovel. FIG. 17 also discloses first and second end openings, 1714 and 1716, of the connector housing 1715. In this embodiment, the first and second end openings' perimeters are equal, and slightly larger than that of the shovel's shaft to allow the shaft passing through the second end opening 1716, and connecting with the connector apparatus inside. To help a user to have a better grab while attaching the connector housing 1715 and the D-shaped grip, grab tabs 1717 are provided and disposed on the exterior of the connector housing.

Figure 18:
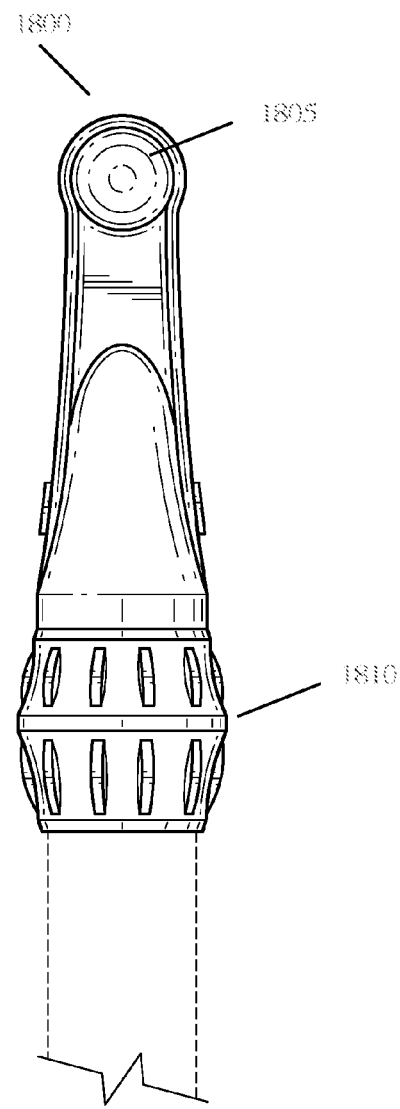
FIG. 18 is a side view of a rotatable handle of the current invention.

FIG. 18 is a side view of another embodiment of the fully assembled rotational handle. FIG. 18 discloses a rotational handle 1800 with the D-shaped grip 1805 is thinner than the connector housing 1810. In this embodiment, the D-shaped grip is also thinner than the shovel's shaft.

Figure 19:
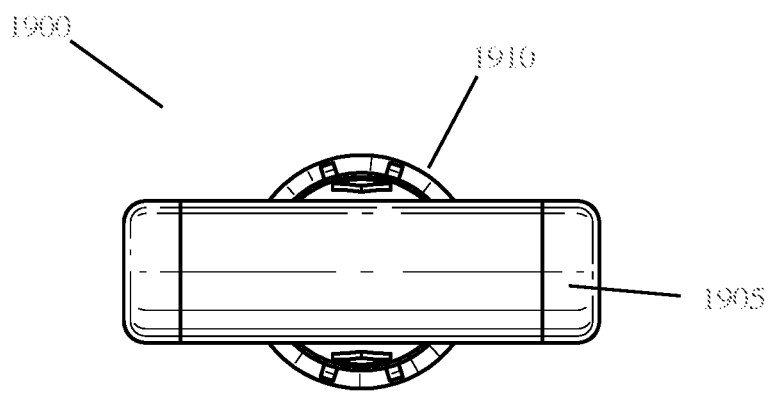
FIG. 19 is a top view of a rotatable handle of the current invention.

FIG. 19 is a top down view of another embodiment of the rotational handle. FIG. 19 discloses a rotational handle 1900 that has a relatively wider D-shaped grip 1905. However, the D-shaped grip is thinner than the connector housing 1910. The connector housing is disposed symmetrically with respect to the vertical axis or Z-axis.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A garden tool apparatus comprising: a rod having a first end and a second end; a shovel connected to said first end of said rod; a rotating handle apparatus connected to said second end of said rod; wherein said rotating hand apparatus is comprised of:
   a) a hand gripping apparatus comprising a shaft extending between two arms of a yoke and a lower cylindrical body having a hollow portion and a outer perimeter wherein said lower cylindrical body further comprises threads along said outer perimeter;
   b) a rotatable apparatus having a cylindrical outer body with a lower rib along the perimeter of said cylindrical outer body and an inner hollow body wherein said hollow body is attached to said second end of said rod;
   c) said rotatable apparatus is further connected to said hollow portion of said hand gripping apparatus, whereby said hollow portion is freely rotational against said rotatable apparatus, and wherein said hand gripping apparatus rotates along the linear axis of said rod;
   d) said rotatable apparatus is further comprised an impediment device wherein said impediment device impedes rotation of said hand gripping apparatus against said rotatable apparatus wherein said impediment device is disabled by applying acute rotation force onto said hand gripping apparatus;
   e) wherein said impeding device is comprised of a plurality of circular sink holes radially positioned along the circumference of a surface within said hollow portion of said hand gripping apparatus;
   f) a plurality of recesses positioned on a surface of said rotatable apparatus wherein each of said plurality of recess houses a metal spring and a stopper wherein said stopper is further inserted into one of said plurality of sink holes when said housing connector is connected to said hollow portion of said hand gripping apparatus thereby impeding the rotation of said hand gripping apparatus against said rotatable apparatus unless acute rotational force is applied onto said hand gripping apparatus;
   g) a cylindrical sleeve encircling said rod and said rotatable apparatus, and wherein said sleeve comprising internal threads and wherein said sleeve secures said rod and said connector housing into said hollow portion of said hand gripping apparatus by engaging said threads inside said sleeve to said threads along said outer perimeter of said and gripping apparatus.

* * * * *